United States Patent
Mauchle et al.

(10) Patent No.: US 9,382,078 B2
(45) Date of Patent: Jul. 5, 2016

(54) POWDER SUPPLYING DEVICE FOR A POWDER COATING INSTALLATION

(75) Inventors: Felix Mauchle, Abtwil (CH); Norbert Honegger, Abtwil (CH); Mark Steinemann, Hofstetten (CH); Hanspeter Michael, Gossau (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 226 days.

(21) Appl. No.: 13/807,447

(22) PCT Filed: Jun. 30, 2011

(86) PCT No.: PCT/US2011/042591
§ 371 (c)(1),
(2), (4) Date: Dec. 28, 2012

(87) PCT Pub. No.: WO2012/003314
PCT Pub. Date: Jan. 5, 2012

(65) Prior Publication Data
US 2013/0094912 A1     Apr. 18, 2013

(30) Foreign Application Priority Data
Jun. 30, 2010  (DE) .......................... 10 2010 025 749

(51) Int. Cl.
| | |
|---|---|
| *B65G 53/40* | (2006.01) |
| *B65G 53/16* | (2006.01) |
| *B05B 7/14* | (2006.01) |
| *B05B 7/24* | (2006.01) |
| *B05B 15/02* | (2006.01) |
| *B08B 9/093* | (2006.01) |

(Continued)

(52) U.S. Cl.
CPC .............. *B65G 53/16* (2013.01); *B05B 7/1404* (2013.01); *B05B 7/1468* (2013.01); *B05B 7/2486* (2013.01); *B05B 12/149* (2013.01); *B05B 15/025* (2013.01); *B05B 15/1285* (2013.01); *B08B 9/093* (2013.01); *B05B 7/1454* (2013.01); *B05B 12/14* (2013.01); *B05B 15/1229* (2013.01); *Y02P 70/36* (2015.11)

(58) Field of Classification Search
USPC ......................................................... 406/122
See application file for complete search history.

(56) References Cited

U.S. PATENT DOCUMENTS 3,517,861 A * 6/1970 De La Vega ..................... 406/63
4,474,327 A * 10/1984 Mattson et al. ............... 239/143

(Continued)

FOREIGN PATENT DOCUMENTS

| CN | 1135377 A | 11/1996 |
|---|---|---|
| WO | 2007072174 A2 | 6/2007 |

OTHER PUBLICATIONS

An International Search Report corresponding to PCT/US2011/042591, dated Nov. 21, 2011.

*Primary Examiner* — William R Harp
(74) *Attorney, Agent, or Firm* — Hauptman Ham, LLP

(57) ABSTRACT

A powder supplying device for a powder coating installation with at least one closed or closable powder container, which has a cuboidal powder chamber for coating powder. In order to quickly change the powder, one or more cleaning compressed-air inlets to which a compressed air source can be connected in a cleaning operation of the powder coating installation for removing residual powder from the powder chamber, in order to introduce cleaning compressed air into the powder chamber, is provided in a side wall of the powder container.

27 Claims, 3 Drawing Sheets

(51) Int. Cl.
*B05B 12/14* (2006.01)
*B05B 15/12* (2006.01)

(56) References Cited

U.S. PATENT DOCUMENTS

| | | | | |
|---|---|---|---|---|
| 4,730,647 | A | * | 3/1988 | Mulder .......................... 141/67 |
| 4,824,295 | A | * | 4/1989 | Sharpless ...................... 406/109 |
| 5,096,126 | A | * | 3/1992 | Giroux et al. ................. 239/690 |
| 5,680,670 | A | | 10/1997 | Adams et al. |
| 5,839,669 | A | * | 11/1998 | Borner et al. ................. 239/704 |
| 7,971,551 | B2 | * | 7/2011 | Mauchle et al. ............... 118/308 |
| 8,166,908 | B2 | * | 5/2012 | Mauchle et al. ............... 118/302 |
| 8,444,351 | B2 | * | 5/2013 | Volonte et al. ................. 406/24 |
| 2003/0190200 | A1 | * | 10/2003 | Hajima et al. ................. 406/191 |
| 2004/0191005 | A1 | | 9/2004 | Kia et al. |
| 2005/0028867 | A1 | | 2/2005 | Ciarelli et al. |
| 2008/0184793 | A1 | * | 8/2008 | Mauchle et al. ............. 73/290 R |
| 2008/0187423 | A1 | * | 8/2008 | Mauchle et al. ............... 414/415 |
| 2008/0257257 | A1 | * | 10/2008 | Mauchle et al. ............... 118/302 |
| 2010/0028090 | A1 | | 2/2010 | Mauchle et al. |
| 2010/0255975 | A1 | * | 10/2010 | Mauchle et al. ................... 494/2 |

* cited by examiner

POWDER SUPPLYING DEVICE FOR A POWDER COATING INSTALLATION

RELATED APPLICATIONS

The present application is a National Phase of International Application Number PCT/US2011/042591, filed Jun. 30, 2011, and claims priority from, German Application Number 102010025749.4, filed Jun. 30, 2010.

Accordingly, the invention relates in particular to a powder supplying device which has at least one closed or closable powder container with a substantially cuboidal powder chamber for coating powder.

The device according to the invention is suitable in particular for supplying powder to a powder coating installation which is used for the electrostatic spray coating of objects with powder and in which fresh coating powder (also called "fresh powder" below) and optionally recovered coating powder (also called "recovery powder" below) are located in the powder container and are fed to a spraying device by a powder discharge device, for example in the form of an injector. The spraying device may be, for example, a handgun or an automatic gun.

Fresh powder is fed as and when required to the powder container via a fresh powder line from a supplier's container in which the powder supplier supplies the fresh powder to the powder user.

The powder forms a compact mass in the supplier's container. By contrast, the coating powder should be in a fluidized state in the powder container so that it can be extracted, for example, by the suction effect of an injector and fed in a compressed-air stream to the spraying device. A powder supplying device therefore contains in particular a powder container which serves as a powder chamber for storing coating powder, the coating powder customarily being fluidized in the powder container so that it can easily be conveyed pneumatically either to another powder container or to a powder spraying device. The latter may be a manual or an automatic powder spraying device which can have a spray nozzle or a rotary atomizer.

The problem addressed by the invention is that powder coating installations and the associated powder supplying devices have to be carefully cleaned when there is a change of powder (change from one type of powder to another type of powder), in particular when there is a change of color (change of powder of one color to powder having a different color), since just a few powder particles of the earlier type of powder may result in coating errors when coating with the new type of powder.

The object of providing an option by means of which a change of powder is rapidly possible in a simple manner is intended to be achieved by the invention.

Accordingly, a powder supplying device is proposed which has a powder container with a substantially cuboidal powder chamber for coating powder, wherein at least one cleaning compressed-air inlet to which a compressed-air line can be connected in a cleaning operation of the powder coating installation for removing residual powder from the powder chamber, in order to introduce cleaning compressed air into the powder chamber, is provided in a side wall of the powder container. Furthermore, it is provided according to the invention that, in addition to the at least one cleaning compressed-air inlet, at least one residual powder outlet is provided, through which residual powder can be driven out from the powder chamber with the aid of the cleaning compressed air introduced into the powder chamber during the cleaning operation. Specifically, it is provided in this case that the at least one cleaning compressed-air inlet has an inlet opening and the at least one residual powder outlet has an outlet opening, the outlet opening of the residual powder outlet pointing in the same direction as the inlet opening of the at least one cleaning compressed-air inlet.

It is conceivable, by way of example, that the outlet opening of the at least one residual powder outlet is provided in the side wall of the powder container in which the inlet opening of the at least one cleaning compressed-air inlet is also provided.

On the other hand, however, it is also conceivable that the at least one residual powder outlet is arranged, for example, in the cover of the powder container, wherein the residual powder outlet should then have a connecting branch or the like which is provided on the inside of the cover and is angled in such a manner that, in the closed state of the powder container, the outlet opening of the residual powder outlet, which outlet opening is defined by the connecting branch, points in the same direction as the inlet opening of the at least one cleaning compressed-air inlet.

The inlet opening of the cleaning compressed-air inlet may be spaced apart in the vertical direction from the outlet opening of the residual powder outlet. However, it is, of course, also conceivable for the inlet opening of the cleaning compressed-air inlet and the outlet opening of the residual powder outlet to be arranged in a common horizontal plane.

In particular, it may be advantageous for space reasons if the outlet opening of the at least one residual powder outlet is provided in an upper region of the side wall of the powder container and the inlet opening of the at least one cleaning compressed-air inlet is provided in a lower region of the side wall of the powder container.

In the powder coating operation of the powder coating installation, in order to be able to feed coating powder (fresh powder or recovery powder) to the powder container in the most optimum manner, the inlet opening of the at least one cleaning compressed-air inlet should be provided in a lower region of the side wall of the powder container and the inlet opening of the at least one powder inlet should be provided spaced apart therefrom, for example in an upper region of the side wall of the powder container, in one of the other side walls of the powder container or alternatively in a cover of the powder container.

Furthermore, the object on which the invention is based is achieved by a powder coating installation which has at least one powder supplying device of the abovementioned type.

The advantages which can be obtained with the solution according to the invention can be seen in particular in that the powder container of the powder supplying device can be cleaned virtually automatically in an effective manner, for example, within the context of a change of powder or color, i.e. without a time-consuming manual intervention for cleaning the powder container being required. All that is needed for this is for cleaning compressed air to be fed to the powder chamber via the inlet opening, which is provided in the side wall of the powder container, of the at least one cleaning compressed-air inlet, said cleaning compressed air—owing to the special arrangement of the inlet opening of the at least one cleaning compressed-air inlet, on the one hand, and the outlet opening of the at least one residual powder outlet, on the other hand—forming an air roll in the powder chamber. With the aid of said air roll which is formed in the powder chamber during the cleaning operation, the residual powder which may still be adhering to the inner walls of the powder container is swirled up and discharged from the powder chamber via the outlet opening of the at least one residual powder outlet. The air roll which forms in the powder chamber for cleaning the powder container is produced in particular because, in the solution according to the invention, the inlet opening of the at least one cleaning compressed-air inlet, via which cleaning compressed air is introduced into the powder chamber during the cleaning operation, is provided in the same side wall of the powder chamber as the outlet opening of the at least one residual powder outlet, via which the cleaning compressed air is discharged from the powder chamber together with the swirled-up residual powder. In this connection, it is particularly expedient if the inlet and outlet openings are spaced apart from one another in the vertical direction.

The powder chamber preferably has an angular internal configuration, and therefore a turbulent flow is formed in the powder chamber during the cleaning operation, as a result of which residual powder possibly adhering to the inner walls of the powder container can be particularly effectively detached and driven out of the powder chamber with the cleaning compressed air.

In a preferred realization of the solution according to the invention, the powder container has at least one powder inlet with an inlet opening via which coating powder can be fed to the powder chamber as and when required during the powder coating operation of the powder coating installation. The inlet opening of the at least one cleaning compressed-air inlet is preferably identical to the inlet opening of the at least one powder inlet. With this particular configuration of the powder container, the inlet opening provided in the side wall of the powder container can be used during the powder coating operation of the powder coating installation for feeding fresh powder or recovery powder as and when required to the powder chamber while said inlet opening is used during the cleaning operation of the powder coating installation in order to feed the cleaning compressed air, which is required for forming the air roll, to the powder chamber.

This particular realization of the solution according to the invention has the advantage that the powder container has a simple construction. In addition thereto, the effect is achieved that the inlet opening, which is used in the powder coating operation of the powder coating installation for feeding coating powder as and when required, is automatically freed from residual powder in the cleaning operation of the powder coating installation since cleaning compressed air is then fed to the powder chamber through said inlet opening.

As already indicated, it is advantageous if the coating powder accommodated in the powder container is fluidized at least during the powder operation of the powder coating installation so that the coating powder can easily be conveyed pneumatically. For this purpose, according to one aspect of the present invention, a fluidizing device for introducing fluidizing compressed air into the powder chamber is also provided. So that no significant positive pressure can be built up by introducing fluidizing compressed air in the powder chamber, the powder container has, for the purpose of equalizing the pressure, at least one fluidizing compressed-air outlet with an outlet opening via which the fluidizing compressed air introduced into the powder chamber for the purpose of fluidizing the coating powder is discharged again from the powder chamber. The outlet opening of the at least one residual powder outlet is preferably identical to the outlet opening of the at least one fluidizing compressed-air outlet. This not only simplifies the construction of the powder container but also permits the fluidizing compressed-air outlet to be automatically cleaned by the cleaning compressed air in the cleaning operation, since the cleaning compressed air is fed out of the powder chamber via the outlet opening of the fluidizing compressed-air outlet after the air roll is formed.

An exemplary embodiment of the solution according to the invention is described below with reference to the attached drawings.

In the drawings:

FIG. 2b shows a view of the end side of the powder container according to FIG. 2a;

FIG. 3b shows a top view of the immersion body according to FIG. 3a;

FIG. 3c shows a view of the end side of the immersion body according to FIG. 3a; and FIG. 3d shows a cross-sectional view through the immersion body according to FIG. 3a.

Figure 1:
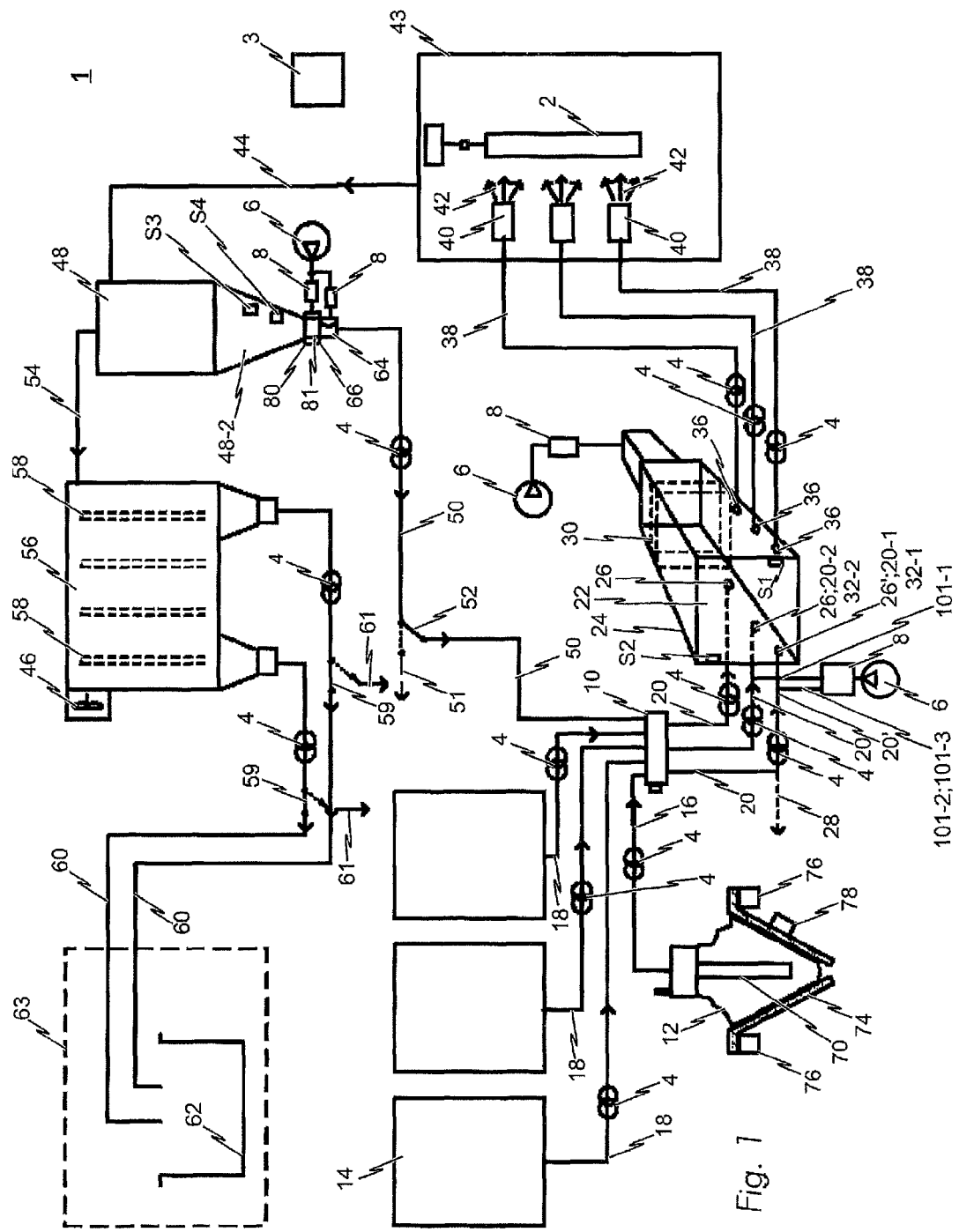
FIG. 1 shows schematically a powder coating installation with a powder supplying device according to the invention.

FIG. 1 shows schematically an exemplary embodiment of a powder coating installation 1 according to the invention for the spray coating of objects 2 with coating powder which is subsequently fused onto the objects 2 in a heating furnace (not illustrated in FIG. 1). One or more electronic control devices 3 are provided for controlling the operation of the powder coating installation 1.

Powder pumps 4 are provided for the pneumatic conveying of the coating powder. These may be injectors into which coating powder is sucked from a powder container by means of compressed air serving as conveying air, after which the mixture of conveying air and coating powder then flows together into a container or to a spraying device.

Suitable injectors are disclosed, for example, in the document EP 0 412 289 B1.

It is also possible to use as the powder pump 4 those types of pump which convey small powder portions successively by means of compressed air, wherein one small powder portion (powder quantity) is in each case stored in a powder chamber and then pushed out of the powder chamber by means of compressed air. The compressed air remains behind the powder portion and pushes the powder portion ahead thereof. These types of pump are sometimes referred to as compressed-air pushing pumps or as slug conveying pumps, since the compressed air pushes the stored powder portion, such as a slug, ahead thereof through a pump outlet line. Various types of such powder pumps for conveying compact coating powder are known, for example, from the following documents: DE 103 53 968 A1, U.S. Pat. No. 6,508,610 B2, US 2006/0193704 A1, DE 101 45 448 A1 or WO 2005/051549 A1.

The invention is not restricted to one of the abovementioned types of powder pumps.

In order to produce the compressed air for the pneumatic conveying of the coating powder and for fluidizing the coating powder, there is a compressed-air source 6 which is connected to the various devices via corresponding pressure-setting elements 8, for example pressure regulators and/or valves.

Fresh powder from a powder supplier is fed from a supplier's container, which may be, for example, a small container 12, for example in the form of a dimensionally stable container or a bag with a powder quantity of, for example, between 10 to 50 kg, for example 25 kg, or, for example, a large container 14, for example likewise a dimensionally stable container or a bag, with a powder quantity of between, for example, 100 kg and 1000 kg, by means of a powder pump 4 in a fresh powder line 16 or 18 to a screening device 10. The screening device 10 may be provided with a vibrator 11. In the description below, the terms "small container" and "large container" both mean "dimensionally stable container" and "flexible bag which is not dimensionally stable", except if reference is expressly made to one or the other type of container.

The coating powder screened by the screening device 10 is conveyed by gravitational force, or preferably in each case by a powder pump 4, via one or more powder feed lines 20, 20' through powder inlet openings 26 into a powder chamber 22 of a dimensionally stable powder container 24. The volume of the powder chamber 22 is preferably substantially smaller than the volume of the fresh-powder small container 12.

According to one conceivable realization of the solution according to the invention, the powder pump 4 of the at least one powder feed line 20, 20' to the powder container 24 is a compressed-air pushing pump. In this case, the initial section of the powder feed line 20 can serve as the pump chamber into which powder screened by the screening device 10 drops through a valve, for example a pinch valve. Once said pump chamber contains a certain powder portion, the powder feed line 20 is disconnected in terms of flow from the screening device 10 by closing of the valve. The powder portion is then pushed by means of compressed air through the powder feed line 20, 20' into the powder chamber 22.

Powder pumps 4, for example injectors, for conveying coating powder through powder lines 38 to spraying devices 40 are connected to one or preferably to more than one powder outlet opening 36 of the powder container 24. The spraying devices 40 can have spray nozzles or rotary atomizers for spraying the coating powder 42 onto the object 2 which is to be coated and which is preferably located in a coating cubical 43.

Figure 2A:
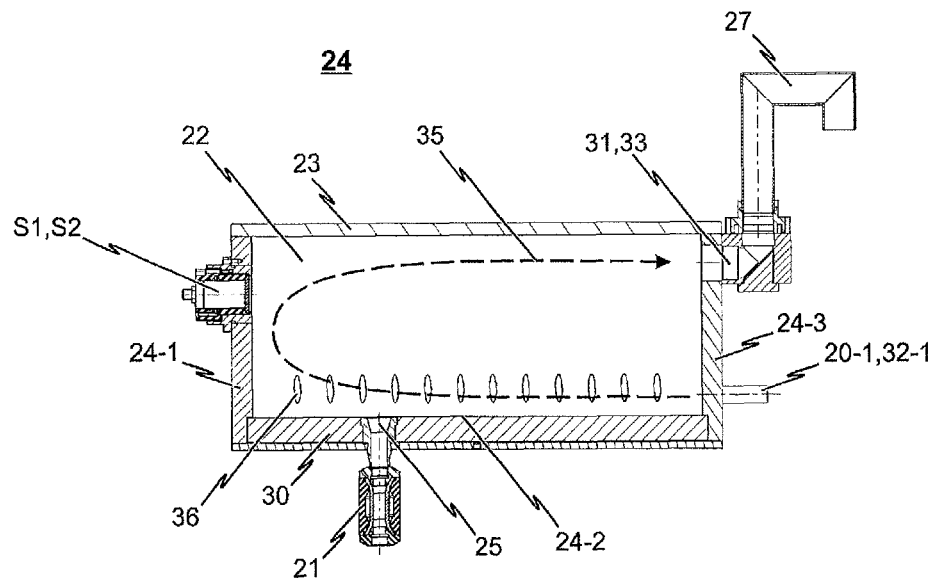
FIG. 2a shows a side longitudinal section view of a powder container according to one exemplary embodiment of the powder supplying device according to the invention.
Figure 2B:
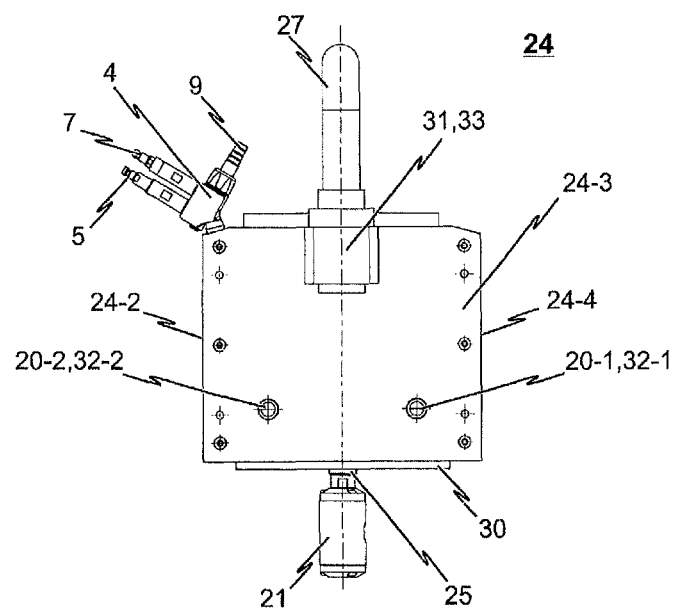

The powder outlet openings 36 can be located—as illustrated in FIG. 1—in a wall of the powder container 24, which wall lies opposite the wall in which the powder inlet openings 26 are located. However, in the embodiment of the powder container 24 that is illustrated in FIG. 2a and FIG. 2b, the powder outlet openings 36 are arranged in a wall which is adjacent to the wall in which the powder inlet openings 26 are located. The powder outlet openings 36 are preferably arranged close to the bottom of the powder chamber 22.

The powder chamber 22 is preferably of a size which lies within the range of a coating powder volumetric capacity of between 1.0 kg and 12.0 kg, preferably between 2.0 kg and 8.0 kg. According to other aspects, the size of the powder chamber 22 is preferably between 500 $cm^3$ and 30,000 $cm^3$, preferably between 2,000 $cm^3$ and 20,000 $cm^3$. The size of the powder chamber 22 is selected depending on the number of powder outlet openings 36 and of the powder lines 38 connected to the latter such that a continuous spray coating operation is possible, but the powder chamber 22 can be rapidly, and preferably automatically, cleaned in coating pauses for a change of powder.

The powder chamber 22 can be provided with a fluidizing device 30 for fluidizing the coating powder accommodated in the powder container 24. The fluidizing device 30 contains at least one fluidizing wall made of a material with open pores or which is provided with narrow pores and is permeable to compressed air but not to coating powder. Although not shown in FIG. 1, it is advantageous if, in the case of the powder container 24, the fluidizing wall forms the bottom of the powder container 24 and is arranged between the powder chamber 22 and a fluidizing compressed-air chamber. The fluidizing compressed-air chamber should be connectable to the compressed-air source 6 via a pressure-setting element 8.

Coating powder 42 which does not adhere to the object 2 to be coated is sucked as excess powder via an excess powder line 44 by means of a suction air stream of a fan 46 into a cyclone separator 48. The excess powder is separated as far as possible from the suction air stream in the cyclone separator 48. The separated powder portion is then conducted as recovery powder from the cyclone separator 48 via a powder recovery line 50 to the screening device 10 where it passes through the screening device 10, either by itself or mixed with fresh powder, via the powder feed lines 20, 20' into the powder chamber 22 again.

Depending on the type of powder and/or degree of powder soiling, the option can also be provided of disconnecting the powder recovery line 50 from the screening device 10 and conducting the recovery powder into a waste container, as illustrated schematically by a dashed line 51 in FIG. 1. The powder recovery line 50, so that it does not need to be disconnected from the screening device 10, may be provided with a diverter 52 at which it can be connected alternatively to the screening device 10 or to a waste container.

The powder container 24 may have one or more than one sensor, for example two sensors S1 and/or S2, in order to control the feeding of coating powder into the powder chamber 22 by means of the control device 3 and the powder pumps 4 in the powder feed lines 20, 20'. For example, the lower sensor S1 detects a lower powder level limit and the upper sensor S2 detects an upper powder level limit.

The lower end portion 48-2 of the cyclone separator 48 can be designed and used as a storage container for recovery powder and, for this purpose, can be provided with one or more than one sensor, for example two sensors S3 and/or S4, which are functionally connected to the control device 3. As a result, the fresh powder feeding through the fresh powder feed lines 16 and 18 can be stopped, for example automatically, if there is sufficient recovery powder in the cyclone separator 48 in order to feed recovery powder to the powder chamber 22 through the screening device 10 in a quantity sufficient for the spray coating operation by means of the spraying devices 40. If there is no longer sufficient recovery powder for this purpose in the cyclone separator 48, a switch can be made automatically to the feeding of fresh powder through the fresh powder feed lines 16 or 18. Furthermore, there is also the option of feeding fresh powder and recovery powder to the screening device 10 simultaneously such that they are mixed with each other.

The outgoing air from the cyclone separator 48 passes via an outgoing-air line 54 into an after-filter device 56 and through one or more filter elements 58 therein to the fan 46 and, downstream of the latter, into the outside atmosphere. The filter elements 58 may be filter bags or filter cartridges or filter plates or similar filter elements. The powder separated from the air stream by means of the filter elements 58 is normally waste powder and drops by means of gravitational force into a waste container or, as shown in FIG. 1, can be conveyed via one or more waste lines 60, which each contain a powder pump 4, into a waste container 62 at a waste station 63.

Depending on the type of powder and powder coating conditions, the waste powder may also be recovered again to the screening device 10 in order to reenter the coating circuit. This is illustrated schematically in FIG. 1 by means of diverters 59 and branch lines 61 of the waste lines 60.

During multi-color operation, in which various colors are each sprayed for only a short period, use is customarily made of the cyclone separator 48 and the after-filter device 56, and the waste powder from the after-filter device 56 passes into the waste container 62. Although the powder-separating efficiency of the cyclone separator 48 is generally lower than that of the after-filter device 56, said cyclone separator can be cleaned more rapidly than the after-filter device 56. During single-color operation, in which the same powder is used for a long period, it is possible to dispense with the cyclone separator 48 and to connect the excess powder line 44 instead of the outgoing-air line 54 to the after-filter device 56, and to connect the waste lines 60, which in this case contain powder which is to be recovered, to the screening device 10 as recovery powder lines.

During the single-color operation, use is then customarily made only of the cyclone separator 48 in combination with the after-filter device 56 if a problematic coating powder is involved. In this case, only the recovery powder from the cyclone separator 48 is fed to the screening device 10 via the powder recovery line 50 while the waste powder from the after-filter device 56 passes as waste into the waste container 62 or into another waste container which can be placed without waste lines 60 directly below an outlet opening of the after-filter device 56.

The lower end of the cyclone separator 48 can have an outlet valve 64, for example a pinch valve. Furthermore, a fluidizing device 66 for fluidizing the coating powder can be provided in the or on the lower end of the lower end portion 48-2 of the cyclone separator 48, which end portion is designed as a storage container, above said outlet valve 64. The fluidizing device 66 contains at least one fluidizing wall 80 made of a material which has open pores or is provided with narrow bores and is permeable to compressed air, but not to coating powder. The fluidizing wall 80 is arranged between the powder path and a fluidizing compressed-air chamber 81. The fluidizing compressed-air chamber 81 can be connected to the compressed-air source 6 via a pressure-setting element 8.

The fresh powder line 16 and/or 18 can be connected in terms of flow at the upstream end thereof, either directly or by the powder pump 4, to a powder conveying tube 70 which can be immersed into the supplier's container 12 or 14 in order to extract fresh coating powder. The powder pump 4 may be arranged at the beginning, at the end or in between in the fresh powder line 16 or 18 or at the upper or lower end of the powder conveying tube 70.

FIG. 1 shows, as the fresh-powder small container, a fresh-powder powder bag 12 in a bag receiving hopper 74. The powder bag 12 is held in a defined shape by the bag receiving hopper 74, with the bag opening being located at the upper end of the bag. The bag receiving hopper 74 may be arranged on a pair of scales or weighing sensors 76. Depending on the type, said pair of scales or the weighing sensors 76 can generate a visual display and/or an electric signal which, after deducting the weight of the bag receiving hopper 74, corresponds to the weight and therefore also to the quantity of coating powder in the small container 12. At least one vibrating vibrator 78 is preferably arranged on the bag receiving hopper 74.

Two or more small containers 12 can be provided in each bag receiving hopper 74 and/or two or more large containers 14, which are alternatively useable, can be provided. This permits rapid changing from one to another small container 12 or large container 14.

Although not illustrated in FIG. 1, it is in principle conceivable for the screening device 10 to be integrated in the powder container 24. Furthermore, the screening device 10 may be omitted if the fresh powder is of a sufficiently good quality. In this case, there is furthermore the option of using a separate screen, for example, upstream or downstream of the cyclone separator 48 or in the cyclone separator 48 itself, to screen the recovery powder of the lines 44 and 55. The recovery powder does not require a screen either if the powder quality thereof is sufficiently good for reuse.

The powder inlet openings 26 are arranged in a side wall of the powder container 24, preferably close to the bottom of the powder chamber 22, while at least one residual powder outlet 33 is furthermore provided in the same side wall of the powder container 24, through which residual powder outlet residual powder can be driven out of the powder chamber 22 during the cleaning operation with the aid of cleaning compressed air introduced into the powder chamber 22.

For this purpose, the powder container 24 has at least one cleaning compressed-air inlet 32-1, 32-2 in a side wall. During the cleaning operation of the powder coating installation 1, the cleaning compressed-air inlets 32-1, 32-2 are connected in terms of flow to a compressed-air source 6 via cleaning compressed-air feed lines 101-1, 101-2, 101-3 in order to feed cleaning compressed air to the powder chamber 22. Each cleaning compressed-air inlet 32-1, 32-2 preferably has an inlet opening in the side wall of the powder container 24, which inlet opening is identical to a powder inlet opening 26 via which coating powder is fed to the powder chamber 22 as and when required during the powder coating operation of the powder coating installation 1.

The operation of cleaning the powder chamber 22 is described in more detail below with reference to the powder containers 24 illustrated in FIG. 2a and FIG. 2b.

Furthermore, in the side wall of the powder container 24, in which the inlet openings of the cleaning compressed-air inlets 32-1, 32-2 are provided, there is at least one outlet opening of a residual powder outlet 33, through which residual powder is driven out of the powder chamber 22 in the cleaning operation of the powder coating installation 1 with the aid of the cleaning compressed air introduced into the powder chamber 22.

As already mentioned, the powder container 24 is equipped with a fluidizing device 30 in order to introduce fluidizing compressed air into the powder chamber 22 at least during the powder coating operation of the powder coating installation 1. Furthermore, the powder container 24 has at least one fluidizing compressed-air outlet 31 with an outlet opening via which the fluidizing compressed air introduced into the powder chamber 22 can be discharged again for the purpose of equalizing the pressure. The outlet opening of the fluidizing compressed-air outlet 31 is preferably identical to the outlet opening of the residual powder outlet 33.

An exemplary embodiment of a powder container 24 of a powder supplying device for a powder coating installation 1 is described in detail below with reference to the illustrations in FIGS. 2a and 2b. The powder container 24 shown in FIGS. 2a and 2b is suitable in particular as part of the powder coating installation 1 described previously with reference to the illustration in FIG. 1.

As illustrated in FIG. 2a, the exemplary embodiment involves a powder container 24 which is closed or is closeable by a cover 23, wherein the cover 23 is connectable to the powder container 24 preferably via a rapidly releasable connection.

The powder container 24 illustrated in FIG. 2a has a substantially cuboidal powder chamber 22 for receiving coating powder. At least one cleaning compressed-air inlet 32-1, 32-2 to which a compressed air source 6 can be connected in a cleaning operation of the powder coating installation 1 for removing residual powder from the powder chamber 22 via a compressed air line, in order to introduce cleaning compressed air into the powder chamber 22, is provided in a side wall 24-3 of the powder container 24. Furthermore, a residual powder outlet 33 which has an outlet opening, via which residual powder can be driven out of the powder chamber 22 during the cleaning operation of the powder coating installation 1 with the aid of the cleaning compressed air introduced into the powder chamber 22, is provided on the abovementioned side wall 24-3 of the powder container 24.

As can be gathered in particular from the illustration in FIG. 2*b*, in the exemplary embodiment of the powder container 24 a total of two cleaning compressed-air inlets 32-1, 32-2 are provided, wherein each of the two cleaning compressed-air inlets 32-1, 32-2 has an inlet opening. On the other hand, just one residual powder outlet 33 with just one outlet opening is provided, wherein the two inlet openings of the cleaning compressed-air inlets 32-1, 32-2 are spaced apart in the vertical direction from the outlet opening of the residual powder outlet 34.

In detail, and as can be gathered in particular from the illustration in FIG. 2*b*, it is provided in the exemplary embodiment that the outlet opening of the residual powder outlet 33 is provided in an upper region of the side wall 24-3 of the powder container 24 and the two inlet openings of the cleaning compressed-air inlets 32-1, 32-2 are provided in a lower region of the side wall 24-3 of the powder container 24. The effect achieved by said special arrangement of the inlet openings, on the one hand, and of the outlet opening, on the other hand, is that, during the cleaning operation of the powder coating installation 1, first of all the residual powder which may still be adhering to the bottom wall 24-2 of the powder container 24 is swirled up by the cleaning compressed air introduced into the powder chamber 22, and is carried out of the powder chamber 22 with the cleaning compressed air via the outlet opening of the residual powder outlet 33.

Also, an air roll 35, as indicated in FIG. 2*a*, is formed in the powder chamber 22. During the cleaning operation, the residual powder which may still be adhering to the walls 24-1, 24-2, 24-3, 24-4 of the powder container 24 and to the cover 23 of the powder container 24 can be detached in an effective manner by said air roll 35 and carried out of the powder chamber 22. Owing to the fact that the outlet opening of the residual powder outlet 33 is arranged in the upper region of that side wall 24-3 of the powder container 24 in which the inlet openings of the two cleaning compressed-air inlets 32-1, 32-2 are also provided, the cleaning compressed air introduced into the powder chamber 22—after having flowed around the side walls 24-1, 24-3, 24-4 and the bottom wall 24-2 and the inner wall of the cover of the powder container 24—can be led out of the powder chamber 22 again without a relatively great change in direction. This has the result that at least most of the residual powder transported along with the cleaning compressed air can be discharged from the powder chamber 22 together with the cleaning compressed air.

In the exemplary embodiment illustrated in FIGS. 2*a* and 2*b*, it is provided that the inlet openings of the two cleaning compressed-air inlets 32-1, 32-2 serve in the powder coating operation of the powder coating installation 1 as powder inlet openings to which powder feed lines 20, 20' can be connected outside the powder chamber 22 for feeding coating powder into the powder chamber 22 as and when required. Accordingly, in the embodiment illustrated, each cleaning compressed-air inlet 32-1, 32-2 obtains the function in the powder coating operation of the powder coating installation 1 of a powder inlet 20-1, 20-2 which are connected in terms of flow to the powder feed lines 20, 20' when required. Of course, however, it is also conceivable to provide separate powder inlets 20-1, 20-2 in addition to the cleaning compressed-air inlets 32-1, 32-2.

In the embodiment illustrated in FIGS. 2*a* and 2*b*, it is provided that, in the powder coating operation of the powder coating installation 1, the inlet opening of one of the two powder inlets 20-1, 20-2 serves for feeding fresh powder as and when required and the inlet opening of the other of the two powder inlets 20-2, 20-1 serves for feeding recovery powder as and when required. Of course, however, it is also conceivable that, in the powder coating operation of the powder coating installation 1, both recovery power and fresh powder can be supplied from one and the same powder inlet 20-2, 20-1 via the inlet opening as and when required.

In the embodiment illustrated in FIG. 2*a* and FIG. 2*b*, a fluidizing device 30 is preferably provided for introducing fluidizing compressed air into the powder chamber 22. The fluidizing compressed air can be introduced into the powder chamber 22 through an end wall, side longitudinal wall, bottom wall or top wall. According to the embodiment illustrated, the bottom wall 24-2 of the powder chamber 22 is designed as a fluidizing floor. It has a multiplicity of open pores or small passage openings through which fluidizing compressed air from a fluidizing compressed-air chamber arranged below the bottom wall can flow upward into the powder chamber 22 in order to set (fluidize) the coating powder therein into a suspended state during the powder coating operation of the powder coating installation 1 such that said coating powder can easily be extracted with the aid of a powder discharge device. The fluidizing compressed air is fed to the fluidizing compressed-air chamber through a fluidizing compressed-air inlet.

So that, during operation of the fluidizing device 30, the pressure within the powder chamber 22 does not exceed a maximum pressure defined in advance, the powder chamber 22 has at least one fluidizing compressed-air outlet 31 with an outlet opening for discharging the fluidizing compressed air introduced into the powder chamber 22 and for equalizing the pressure. In particular, the outlet opening of the at least one fluidizing compressed-air outlet 31 should be dimensioned in such a manner that at maximum a positive pressure of 0.5 bar prevails over atmospheric pressure during the operation of the fluidizing device 30 in the powder chamber 22.

In the embodiment illustrated in FIGS. 2*a* and 2*b*, the outlet opening of the residual powder outlet 33 is identical to the outlet opening of the fluidizing compressed-air outlet 31. Of course, however, it is also possible that the fluidizing compressed-air outlet 31 is provided, for example, in the cover 23 of the powder container 24.

As can be gathered in particular in the illustration in FIG. 2*a*, in the embodiment shown, the fluidizing compressed-air outlet 31 has a venting line which is connected or can be connected outside the powder chamber 22 to a rising pipe 27 for preventing a powder emission from the powder chamber 22 during the powder coating operation of the powder coating installation 1.

In order to discharge the fluidizing compressed air introduced into the powder chamber 22, it is furthermore conceivable to provide a venting line which preferably projects into the upper region of the powder chamber 22. The projecting end of the venting line can project into an extraction funnel of an extraction installation. Said extraction installation can be formed, for example, as a booster (air mover). A booster, which is also known as an air mover, operates in accordance with the Coanda effect and, for the operation thereof, requires customary compressed air which has to be fed in a small quantity. Said air quantity has a higher pressure than the ambient pressure. The booster generates an air flow of high velocity, with a large volume and low pressure, in the extraction funnel. A booster is therefore particularly readily suitable in conjunction with the venting line or the fluidizing compressed-air outlet 31.

In the exemplary embodiment illustrated in FIG. 2a, the powder container 24 has a contactlessly operating level sensor S1, S2 for detecting the maximum permissible powder level in the powder chamber 22. It is conceivable in this connection to provide a further level sensor which, with regard to the powder container 24, is arranged so as to detect a minimum powder level and, as soon as said minimum powder level is reached or the level drops therebelow, to output a corresponding message to a control device 3 in order, preferably automatically, to feed fresh powder or recovery powder to the powder chamber 22 via the inlet opening of the at least one powder inlet 20-1, 20-2.

The level sensor S1, S2 for detecting the powder level in the powder chamber 22 is preferably a contactlessly operating level sensor and is arranged outside the powder chamber 22 and separated from it. This prevents soiling of the level sensor S1, S2. The level sensor S1, S2 generates a signal when the powder level has reached a certain height. It is also possible for a plurality of such powder level sensors S1, S2 to be arranged at different heights, for example for detecting predetermined maximum levels and for detecting a predetermined minimum level.

The signals of the at least one level sensor S1, S2 are used preferably for controlling an automatic powder feeding of coating powder through the powder inlets 20-1, 20-2 into the powder chamber 22 in order to maintain a predetermined level or a predetermined level region therein even during the period during which the injectors 4 extract coating powder out of the powder chamber 22 and to convey said coating powder pneumatically to spraying devices 40 (or into other containers).

During such a powder spray coating operation, cleaning compressed air is only conducted into the powder chamber 22 at reduced pressure, if at all.

For cleaning the powder chamber 22 in coating pauses, for example during the change from one type of powder to another type of powder, cleaning compressed air is fed to the powder chamber 22 through the at least one cleaning compressed-air inlet 32-1, 32-2. The cleaning compressed air generates an air roll 35 in the interior of the powder container 24, said air roll detaching residual powder which may be adhering to the inner wall of the powder container 24 and driving said residual powder out of the powder chamber 22 through the residual powder outlet 34.

Although not explicitly illustrated in the drawings, it is furthermore conceivable to provide a device for measuring the air pressure prevailing in the powder chamber 22. This is important in so far as care should be taken to ensure that an excessive positive pressure cannot be built up in the interior of the powder container 24 by the introduction of fluidizing compressed air during the powder coating operation of the powder coating installation 1 and by introduction of cleaning compressed air in the cleaning operation of the powder coating installation 1, since the powder container 24 is generally not designed as a high pressure container. In this respect, it is preferred if the maximum permissible positive pressure in the powder chamber 22 does not exceed the value of 0.5 bar.

In the embodiment last mentioned, it is conceivable in particular for the air pressure measured in the powder chamber 22 to be fed continuously or at predetermined times or events to a control device 3, wherein the amount of fluidizing compressed air fed to the powder chamber 22 per unit of time, and/or the amount of fluidizing compressed air discharged from the powder chamber 22 per unit of time via the at least one fluidizing compressed-air outlet 31 are/is adjusted, preferably automatically, in dependence on the air pressure prevailing in the powder chamber 22. By contrast, during the cleaning operation of the powder coating installation 1, it is preferred if, with the aid of the control device 3, the amount of cleaning compressed air fed to the powder chamber 22 per unit of time and/or the amount of cleaning compressed air discharged per unit of time via the at least one residual powder outlet 33 are/is adjusted, preferably automatically, in dependence on the air pressure prevailing in the powder chamber 22.

As can be gathered from the illustration in FIG. 2a, it is provided in the exemplary embodiment that a powder outlet 25, which can be opened with the aid of a pinch valve 21 in order to remove coating powder from the powder chamber 22 as and when required, preferably by gravitational force, is provided in the bottom wall 24-2 of the powder container 24. This is required in particular whenever coating powder of the old type is still present in the powder chamber 22 when there is a change of color or powder.

The powder chamber 22 particularly preferably has an angular inner configuration, in which the base area and the side faces of the powder chamber 22 are connected to one another via edges, in particular right-angled edges. It is ensured by said angular inner configuration of the powder chamber 22 that, during the cleaning operation of the powder coating installation 1, the air roll 35 forming in the interior of the powder chamber 22 builds up a turbulent boundary layer rather than a laminar boundary layer, which facilitates the removal of residual powder adhering to the inner wall of the powder container 24.

In order to be able to form as ideal an air roll 35 as possible in the interior of the powder container 24 during the cleaning operation of the powder coating installation 1, it has been shown in practice that it is preferred if the powder chamber 22 has a height of 180 mm to 260 mm, preferably of 200 mm to 240 mm, and more preferably of 220 mm, the powder chamber 22 having a width of 140 mm to 220 mm, preferably of 160 mm to 200 mm, and more preferably of 180 mm, and the powder chamber 22 having a length of 510 mm to 590 mm, preferably of 530 mm to 570 mm, and more preferably of 550 mm. Given said stated dimensions of the powder chamber 22, the at least one cleaning compressed-air inlet 32-1, 32-2 and the at least one residual powder outlet 33 should furthermore be provided in a common end wall 24-3 of the powder container 24.

The powder supplying device shown in FIG. 2a and FIG. 2b furthermore has at least one powder discharge device in order to be able to convey coating powder by means of one, preferably more than one, injector 4 via powder hoses 38 to spraying devices 40 and to be able to spray said coating powder by means of said spraying devices onto an object 2 to be coated. Instead of injectors 4, other types of powder discharge device, for example powder pumps, may be used.

As illustrated in FIG. 2a, corresponding powder discharge openings 36 are provided in the chamber walls 24-3 and 24-4 of the powder container 24. In the embodiment illustrated, it is provided that each of the powder discharge openings 36 is connected in terms of flow to an associated injector 4 in order to be able to suck coating powder out of the powder chamber 22 during the powder coating operation of the powder coating installation 1 and to be able to feed said coating powder to the spraying devices 40. The powder discharge openings 36 preferably have an elliptical shape such that the effective region for sucking up fluidized coating powder is increased.

The powder discharge openings 36 are arranged as low as possible in the powder chamber 22 in order to be able to extract as far as possible all of the coating powder out of the powder chamber 22 by means of the injectors 4. The injectors 4 are preferably located at a location positioned higher than the highest powder level and are each connected by a powder discharge channel to one of the powder discharge openings 36. Owing to the fact that the injectors 4 are arranged higher than the maximum powder level, it is avoided that the coating powder rises up out of the powder chamber 22 into the injectors 4 if the injectors 4 are not switched on.

As illustrated in FIG. 2b, each injector 4 has an input 5 for conveying compressed air which generates a negative pressure in a negative pressure region of the injector 4 and, as a result, sucks coating powder out of the powder chamber 22 at a powder suction input and then conveys said coating powder through a powder output 9 by a powder hose 38 to a receiving point, which may be the abovementioned spraying device 40 or a further powder container 24. In order to support the powder conveying, the injector 4 can be provided with an additional compressed-air input 7 for feeding additional compressed air into the conveying-air powder stream at the powder output 9.

In the embodiment illustrated in FIG. 2a and FIG. 2b, a multiplicity of powder discharge devices are used, the powder discharge channels of the multiplicity of powder discharge devices being formed within two opposite side walls 24-3, 24-4 of the powder container 24. Of course, however, it is also conceivable for the powder discharge channels not to be formed in side walls of the powder container 24 but rather to be formed as powder suction tubes.

In order to finely clean the powder container 24, and in particular in order to remove residual powder from the at least one powder discharge device and the powder discharge channel or the powder discharge opening 36 of the at least one powder discharge device, the powder supplying device can furthermore be provided with a mechanically guided immersion body 90, as shown in an exemplary embodiment in FIGS. 3a to 3d.

The immersion body 90 is of a size and configuration such that it can be inserted from above into the powder chamber 22. The immersion body 90 has at least one purging compressed-air inlet 95-1, 95-2, each with an inlet opening which in the inserted state of the immersion body 90 can be connected to the inlet opening of the at least one cleaning compressed-air inlet 32-1, 32-2 provided in the one side wall 24-3 of the powder chamber 22 for feeding cleaning compressed air to a compressed-air line system 96 of the immersion body 90.

Furthermore, the immersion body 90 has at least one purging compressed-air outlet opening 93, which is connected to the compressed-air line system 96 and in the inserted state of the immersion body 90 can be connected to the powder discharge opening 36 of the at least one powder discharge device for driving out residual powder from the powder discharge device with the aid of the cleaning compressed air.

According to the embodiment shown in FIG. 2a, the powder discharge openings 36 are each arranged in a row at a distance one behind another in the side walls 24-3 and 24-4 of the powder container 24, and the purging compressed-air outlet openings 93 of the immersion body 90 are each likewise arranged in a row one behind another at the same spacing as the powder discharge openings 36.

The inlet opening of the at least one purging compressed-air inlet 95-1, 95-2 of the immersion body 90 is preferably arranged in the immersion body 90 in such a manner that, in the inserted state of the immersion body 90, it is aligned such that it is centered with regard to the inlet opening of the cleaning compressed-air inlet 32-1, 32-2 provided in the one side wall 24-3 of the powder container 22 for automatically connecting the inlet openings to the purging compressed-air inlets 95-1, 95-2 of the immersion body 90 when the immersion body 90 is inserted into the powder chamber 22. At the same time, the at least one purging compressed-air outlet opening 93 of the immersion body 90 should be arranged in such a manner that, in the inserted state of the immersion body 90, it is aligned such that it is centered with regard to the powder discharge opening 36 of the at least one powder discharge device for automatically connecting the purging compressed-air outlet opening 93 of the immersion body 90 to the powder discharge openings 36 of the at least one powder discharge device when the insertion body 90 is inserted into the powder chamber 22.

Figure 3A:
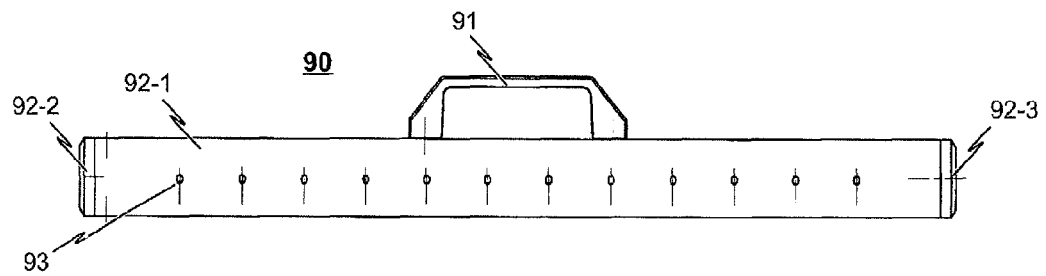
FIG. 3a shows a side view of an exemplary embodiment of an immersion body which can be inserted into the powder chamber for finely cleaning the powder container.
Figure 3B:
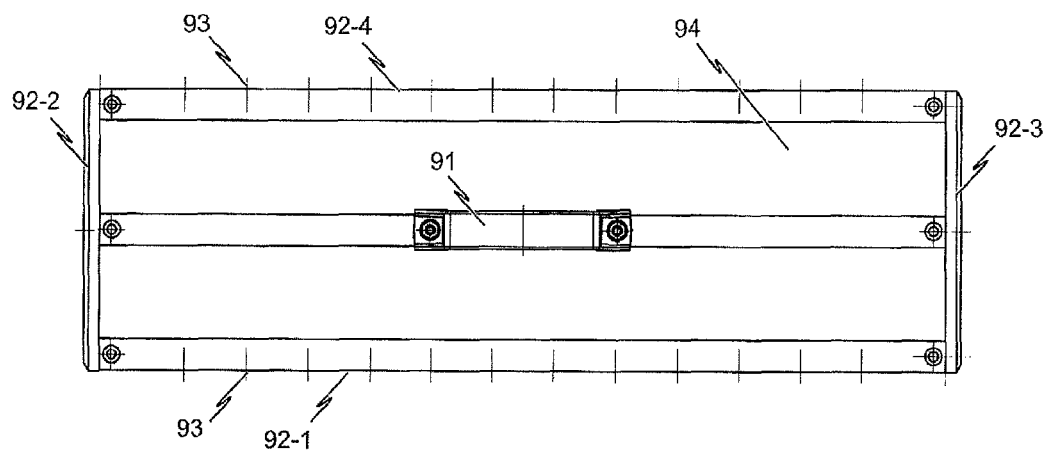
Figures 3C, 3D:
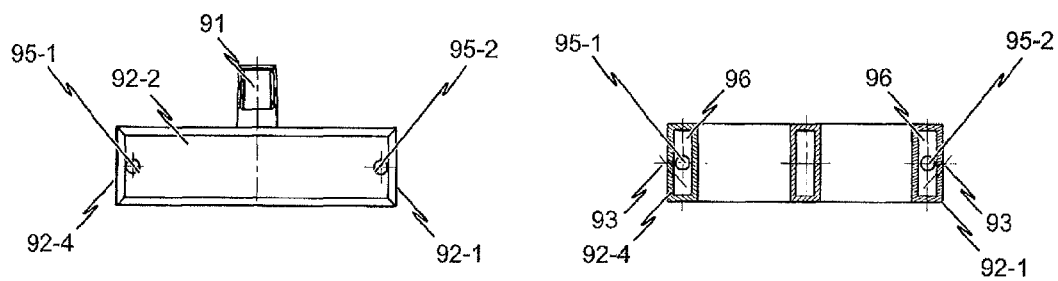

In detail, and as can be gathered in particular from the illustration in FIG. 3a, it is provided in the exemplary embodiment that the immersion body 90 has a cuboidal outer configuration, with the inlet opening of the at least one purging compressed-air inlet 95-1, 95-2 being provided in a first end side 92-2 of the immersion body 90.

At least one tension spring can be provided on the opposite end side 92-3 of the immersion body 90 and can be used to pretension the immersion body 90 against that side wall 24-3 of the powder chamber 22 in which the purging compressed-air inlet 32-1, 32-2 is provided together with the inlet opening thereof, when the immersion body 90 is inserted into the powder chamber 22.

In order to prevent a positive pressure from being able to build up between the immersion body 90 and the bottom wall 24-2 of the powder chamber 22 in the inserted state of the immersion body 90, the immersion body 90 is provided with openings 94 for equalizing the pressure.

The immersion body has an outer circumference which is adapted to the inner circumference of the powder chamber 22.

With the aid of the immersion body 90, the purging compressed air can be driven through the powder discharge openings 36 and from the latter through the powder discharge channels and the injectors 4. The invention also contains the option of blowing compressed air in the reverse direction through the powder discharge openings 36 in order to remove residual powder therefrom.

Seals are particularly preferably provided on the circumferential surface of the immersion body 90 in order to permit optimum sealing of the gap between the immersion body 90 and the side walls 24-1, 24-3, 24-4, 24-5 of the powder container 24 in the inserted state of the immersion body 90 such that the purging compressed air fed to the immersion body 90 can be used as fully as possible to clean the powder discharge openings 36 or powder discharge channels.

Finally, it is preferred if the powder chamber 22 is provided with a removable cover 23, wherein said cover 23 can be connected to the powder chamber 22 with the aid of a rapidly releasable connection in order to permit rapid access to the powder chamber 22, this being required, for example, should manual recleaning with the aid of, for example, a compressed air gun, be required. The rapidly releasable connection between the cover and the powder chamber 22 may be, for example, a mechanical, magnetic, pneumatic or hydraulic connection.

The invention is not restricted to the previously described exemplary embodiments but rather follows from an overall view of all of the features disclosed herein.

It is particularly preferred if, in the case of the powder supplying device, the inlet opening 26 of the at least one cleaning compressed-air inlet 32-1, 32-2 is provided in a lower region of the side wall 24-3 of the powder container 24 and the inlet opening 26 of the at least one powder inlet 20-1, 20-2 is provided spaced apart therefrom, for example in an upper region of the side wall 24-3 of the powder container 24, in one of the further side walls 24-1, 24-2, 24-4 or in the cover 23 of the powder container 24.

The invention claimed is:

1. A powder supplying device for a powder coating installation, the powder supplying device comprising:
    at least one closed or closable powder container, which has a substantially cuboidal powder chamber for coating powder,
    wherein at least one cleaning compressed-air inlet to which a compressed air source can be connected in a cleaning operation of the powder coating installation for removing residual powder from the powder chamber, in order to introduce cleaning compressed air into the powder chamber, is provided in a side wall of the powder container, and wherein at least one residual powder outlet is provided, through which residual powder can be driven out from the powder chamber with the aid of the cleaning compressed air introduced into the powder chamber,
    the at least one cleaning compressed-air inlet having an inlet opening and the at least one residual powder outlet having an outlet opening, the outlet opening of the residual powder outlet pointing in the same direction as the inlet opening of the at least one cleaning compressed-air inlet, and
    at least one of:
    (i) the powder container having at least one powder inlet with an inlet opening for feeding coating powder as and when required into the powder chamber during the powder coating operation of the powder coating installation and the inlet opening of the at least one cleaning compressed-air inlet being provided in a lower region of the side wall of the powder container and the inlet opening of the at least one powder inlet being provided in a cover of the powder container or in the side wall of the powder container;
    (ii) the powder container having at least one powder inlet with an inlet opening for feeding coating powder as and when required into the powder chamber during the powder coating operation of the powder coating installation and the inlet opening of the at least one cleaning compressed-air inlet being identical to the inlet opening of the at least one powder inlet; or
    (iii) the powder supplying device including at least one powder outlet, which can be opened with the aid of a pinch valve in order to remove coating powder from the powder chamber as and when required, by gravitational force, being provided in a bottom wall of the powder container.

2. Powder supplying device according to claim 1, which also has a fluidizing device for introducing fluidizing compressed air into the powder chamber, the powder chamber having at least one fluidizing compressed-air outlet with an outlet opening for discharging the fluidizing compressed air introduced into the powder chamber.

3. Powder supplying device according to claim 2, the outlet opening of the at least one residual powder outlet being identical to the outlet opening of the at least one fluidizing compressed-air outlet.

4. Powder supplying device according to claim 2, the at least one fluidizing compressed-air outlet having a venting line which on the one hand is connected or can be connected to the outlet opening of the fluidizing compressed-air outlet and on the other hand opens out into an extraction funnel.

5. Powder supplying device according to claim 1, at least one level sensor also being provided for detecting at least one powder level in the powder chamber.

6. Powder supplying device according to claim 5, the at least one level sensor being a contactlessly operating level sensor which is arranged outside the powder chamber and separated from it.

7. Powder supplying device according to claim 1, the powder chamber having a height of 180 mm to 260 mm; the powder chamber having a width of 140 mm to 220 mm; and
the powder chamber having a length of 510 mm to 590 mm.

8. Powder supplying device according to claim 1, the powder chamber having a height of 200 mm to 240 mm; the powder chamber having a width of 160 mm to 200 mm; and
the powder chamber having a length of 530 mm to 570 mm.

9. Powder supplying device according to claim 1, the powder chamber having a height of about 220 mm; the powder chamber having a width of about 180 mm; and the powder chamber having a length of about 550 mm.

10. Powder supplying device according to claim 1, wherein the closable powder container has a fixed volume when closed.

11. Powder supplying device according to claim 1, wherein the closable powder container includes a first wall and a second wall opposite the first wall, wherein a distance between the first wall and the second wall is fixed, wherein the first wall is the side wall.

12. Powder supplying device according to claim 1, wherein the side wall structurally supports another portion of the closable powder container that forms the cuboidal powder chamber.

13. Powder supplying device according to claim 1, wherein the side wall is fixed relative to a geometric location within the powder container spaced away from the side wall.

14. Powder supplying device according to claim 1, the cover being able to be connected to the powder chamber via a quickly releasable connection.

15. Powder supplying device according to claim 1, wherein the side wall is fixed relative to another wall of the powder container.

16. Powder supplying device according to claim 1, wherein the powder container includes a second side wall, wherein the side wall in which the at least one cleaning compressed-air inlet is provided is stationary relative to the second side wall.

17. Powder coating installation for powder-coating objects, the powder coating installation having at least one powder supplying device according to claim 1.

18. A powder supplying device for a powder coating installation, the powder supplying device comprising:
    at least one closed or closable powder container, which has a substantially cuboidal powder chamber for coating powder,
    wherein at least one cleaning compressed-air inlet to which a compressed air source can be connected in a cleaning operation of the powder coating installation for removing residual powder from the powder chamber, in order to introduce cleaning compressed air into the powder chamber, is provided in a side wall of the powder container, and wherein at least one residual powder outlet is provided, through which residual powder can be driven out from the powder chamber with the aid of the cleaning compressed air introduced into the powder chamber,
    wherein the at least one cleaning compressed-air inlet has an inlet opening and the at least one residual powder outlet having an outlet opening, the outlet opening of the residual powder outlet pointing in the same direction as the inlet opening of the at least one cleaning compressed-air inlet, the powder supplying device also including a fluidizing device for introducing fluidizing compressed air into the powder chamber, the powder chamber having at least one fluidizing compressed-air outlet with an outlet opening for discharging the fluidizing compressed air introduced into the powder chamber, and the fluidizing compressed-air outlet having a venting line which is connected or can be connected outside the powder container to a rising pipe for preventing a powder emission from the powder chamber during the powder coating operation of the powder coating installation.

19. A powder supplying device for a powder coating installation, the powder supplying device comprising:

at least one closed or closable powder container, which has a substantially cuboidal powder chamber for coating powder, wherein at least one cleaning compressed-air inlet to which a compressed air source can be connected in a cleaning operation of the powder coating installation for removing residual powder from the powder chamber, in order to introduce cleaning compressed air into the powder chamber, is provided in a side wall of the powder container, and wherein at least one residual powder outlet is provided, through which residual powder can be driven out from the powder chamber with the aid of the cleaning compressed air introduced into the powder chamber, the at least one cleaning compressed-air inlet having an inlet opening and the at least one residual powder outlet having an outlet opening, the outlet opening of the residual powder outlet pointing in the same direction as the inlet opening of the at least one cleaning compressed-air inlet, and at least one of:
(i) at least one powder outlet, which can be opened with the aid of a pinch valve in order to remove coating powder from the powder chamber as and when required, being provided in a bottom wall of the powder container;
(ii) at least one powder discharge device also being provided, which discharge device is connected or can be connected via a powder discharge opening to the powder chamber for sucking coating powder out of the powder chamber during the powder coating operation of the powder coating installation, and the at least one powder discharge device having an injector, which is connected to a powder discharge channel opening out via the powder discharge opening in the powder chamber, the powder discharge opening; or
(iii) at least one powder discharge device also being provided, which discharge device is connected or can be connected via the powder discharge opening to the powder chamber for sucking coating powder out of the powder chamber during the powder coating operation of the powder coating installation, and an immersion body that can be mechanically inserted into the powder chamber also being provided for finely cleaning the at least one powder discharge device during the cleaning operation of the powder coating installation.

20. Powder supplying device according to claim 19,
the injector of the at least one powder discharge device being arranged in relation to the powder chamber at a location which is higher than the highest powder level that can be set in the powder chamber.

21. Powder supplying device according to claim 20,
a multiplicity of powder discharge devices being provided, the powder discharge channels of the multiplicity of powder discharge devices being formed within two opposite side walls of the powder chamber.

22. Powder supplying device according to claim 21,
the two opposite side walls of the powder chamber being respectively adjacent to the side wall of the powder chamber in which the inlet opening of the at least one cleaning compressed-air inlet and the outlet opening of the at least one residual powder outlet are provided.

23. Powder supplying device according to claim 19,
the immersion body having at least one purging compressed-air inlet, which in the inserted state of the immersion body can be connected to the inlet opening of the at least one cleaning compressed-air inlet provided in the one side wall of the powder container for feeding cleaning compressed air to a compressed-air line system of the immersion body; and
the immersion body having at least one purging compressed-air outlet, which is connected to the compressed air source and in the inserted state of the immersion body can be connected to the powder discharge opening of the at least one powder discharge device for driving out residual powder from the powder discharge device with the aid of the cleaning compressed air.

24. Powder supplying device according to claim 23,
the at least one purging compressed-air inlet of the immersion body being configured in such a way that, in the inserted state of the immersion body, it is aligned such that it is centred with regard to the inlet opening of the at least one cleaning compressed-air inlet provided in the side wall of the powder container for automatically connecting the at least one purging compressed-air inlet to the inlet opening when the immersion body is inserted into the powder chamber.

25. Powder supplying device according to claim 23,
the at least one purging compressed-air outlet of the immersion body being formed in such a way that, in the inserted state of the immersion body, it is aligned such that it is centred with regard to the powder discharge opening of the at least one powder discharge device for automatically connecting the at least one purging compressed-air outlet of the immersion body to the powder discharge opening of the at least one powder discharge device when the immersion body is inserted into the powder chamber.

26. Powder supplying device according to claim 19,
the immersion body having a cuboidal outer configuration, the at least one purging compressed-air inlet being provided in a first end face of the immersion body, and at least one tension spring being provided on the opposite end face of the immersion body for pretensioning the immersion body against the side wall of the powder chamber in which the at least one cleaning compressed-air inlet is provided when the immersion body is inserted in the powder chamber.

27. Powder supplying device according to claim 19,
the injector of the at least one powder discharge device being arranged in relation to the powder chamber at a location which is higher than the highest powder level that can be set in the powder chamber, and
the powder discharge channel being formed within a side wall of the powder chamber.

* * * * *